(12) United States Patent
Bhathena et al.

(10) Patent No.: US 12,393,623 B2
(45) Date of Patent: Aug. 19, 2025

(54) SYSTEMS AND METHODS FOR GENERATING QUERY PARAMETERS FROM NATURAL LANGUAGE UTTERANCES

(71) Applicant: JPMORGAN CHASE BANK, N.A., New York, NY (US)

(72) Inventors: Hanoz Bhathena, New York, NY (US); Prateek Singh, Jersey City, NJ (US); Aviral Joshi, Seattle, WA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/168,904

(22) Filed: Feb. 14, 2023

(65) Prior Publication Data

US 2024/0273126 A1    Aug. 15, 2024

(51) Int. Cl.
   *G06F 16/00*     (2019.01)
   *G06F 16/3332*   (2025.01)
   *G06F 16/334*    (2025.01)

(52) U.S. Cl.
   CPC ...... *G06F 16/3347* (2019.01); *G06F 16/3334* (2019.01); *G06F 16/3344* (2019.01); *G06F 16/3346* (2019.01)

(58) Field of Classification Search
   CPC ............. G06F 16/3347; G06F 16/3334; G06F 16/3344; G06F 16/3346
   USPC ........................................................ 707/771
   See application file for complete search history.

(56) References Cited

U.S. PATENT DOCUMENTS

| | | | |
|---|---|---|---|
| 10,121,467 B1 * | 11/2018 | Gandhe | G06F 40/247 |
| 10,721,242 B1 * | 7/2020 | Jones | H04L 63/126 |
| 10,943,583 B1 * | 3/2021 | Gandhe | G10L 15/183 |
| 11,924,378 B2 * | 3/2024 | Karp | H04M 3/5166 |
| 2013/0304758 A1 * | 11/2013 | Gruber | G06F 16/9535 707/769 |
| 2019/0251165 A1 * | 8/2019 | Bachrach | G06N 3/084 |
| 2020/0152179 A1 * | 5/2020 | van Hout | G10L 15/22 |
| 2020/0294071 A1 * | 9/2020 | Christensen | G06F 16/24578 |
| 2022/0129556 A1 * | 4/2022 | Chen | G06F 21/74 |
| 2022/0237934 A1 * | 7/2022 | Matcham | G06F 18/285 |
| 2022/0405313 A1 * | 12/2022 | Banipal | G06N 5/02 |
| 2023/0245654 A1 * | 8/2023 | Shrivastava | G10L 15/1822 704/243 |

FOREIGN PATENT DOCUMENTS

CN        111104437 A    *   5/2020

* cited by examiner

*Primary Examiner* — Monica M Pyo
(74) *Attorney, Agent, or Firm* — GREENBERG TRAURIG LLP

(57) ABSTRACT

A method may receive a text string of an utterance. A method may tokenize the utterance into a plurality of tokens. A method may transform the plurality of tokens into a plurality of feature vectors. A method may assign an entity label to each of the plurality of feature vectors. A method may resolve each feature vector of the plurality of feature vectors to a corresponding standardized value of a database query language.

8 Claims, 5 Drawing Sheets

SYSTEMS AND METHODS FOR GENERATING QUERY PARAMETERS FROM NATURAL LANGUAGE UTTERANCES

BACKGROUND

1. Field of the Invention

Aspects generally relate to systems and methods for generating query parameters from natural language utterances.

2. Description of the Related Art

Natural language searches tend to be rudimentary, allowing mainly word or phrase matching. Search categories and date windows are still generally specified with UI widgets and remain time consuming and unintuitive. It is much more convenient and seamless for humans to form questions in natural language utterances. But certain words from an utterance must be transformed into query parameters in order to execute a database query based on the utterance. Ingesting complex human utterances, precisely determining what is requested by the utterance, and returning queryable parameters presents technological challenges.

SUMMARY

In some aspects, the techniques described herein relate to a method including: receiving a text string of an utterance; tokenizing the utterance into a plurality of tokens; transforming the plurality of tokens into a plurality of feature vectors; assigning an entity label to each of the plurality of feature vectors; and resolving each feature vector of the plurality of feature vectors to a corresponding standardized value of a database query language.

In some aspects, the techniques described herein relate to a method, including: determining an intent of the utterance based on the plurality of feature vectors.

In some aspects, the techniques described herein relate to a method, including: formatting a database query in the database query language including each corresponding standardized value.

In some aspects, the techniques described herein relate to a method, wherein resolving each feature vector of the plurality of feature vectors to a corresponding standardized value of a database query language includes processing each feature vector of the plurality of feature vectors with a string-based algorithm.

In some aspects, the techniques described herein relate to a method, wherein the string-based algorithm computes a Levenshtein distance.

In some aspects, the techniques described herein relate to a method, wherein resolving each feature vector of the plurality of feature vectors to a corresponding standardized value of a database query language includes processing each feature vector of the plurality of feature vectors with a probabilistic model.

In some aspects, the techniques described herein relate to a method, including: scoring each feature vector of the plurality of feature vectors with respect to candidates from reference data table.

In some aspects, the techniques described herein relate to a method, including: mapping each feature vector of the plurality of feature vectors to a key value, wherein the key value corresponds to a candidate with a highest score.

In some aspects, the techniques described herein relate to a system including at least one computer including a processor, wherein the at least one computer is configured to: receive a text string of an utterance; tokenize the utterance into a plurality of tokens; transform the plurality of tokens into a plurality of feature vectors; assign an entity label to each of the plurality of feature vectors; and resolve each feature vector of the plurality of feature vectors to a corresponding standardized value of a database query language.

In some aspects, the techniques described herein relate to a system, wherein the at least one computer is configured to: determine an intent of the utterance based on the plurality of feature vectors.

In some aspects, the techniques described herein relate to a system, wherein the at least one computer is configured to: format a database query in the database query language including each corresponding standardized value.

In some aspects, the techniques described herein relate to a system, wherein the at least one computer is configured to: process each feature vector of the plurality of feature vectors with a string-based algorithm.

In some aspects, the techniques described herein relate to a system, wherein the at least one computer is configured to: score each feature vector of the plurality of feature vectors with respect to candidates from reference data table.

In some aspects, the techniques described herein relate to a system, wherein the at least one computer is configured to: map each feature vector of the plurality of feature vectors to a key value, wherein the key value corresponds to a candidate with a highest score.

In some aspects, the techniques described herein relate to a non-transitory computer readable storage medium, including instructions stored thereon, which instructions, when read and executed by one or more computer processors, cause the one or more computer processors to perform steps including: receiving a text string of an utterance; tokenizing the utterance into a plurality of tokens; transforming the plurality of tokens into a plurality of feature vectors; assigning an entity label to each of the plurality of feature vectors; and resolving each feature vector of the plurality of feature vectors to a corresponding standardized value of a database query language.

In some aspects, the techniques described herein relate to a non-transitory computer readable storage medium, including: determining an intent of the utterance based on the plurality of feature vectors.

In some aspects, the techniques described herein relate to a non-transitory computer readable storage medium, including: formatting a database query in the database query language including each corresponding standardized value.

In some aspects, the techniques described herein relate to a non-transitory computer readable storage medium, wherein resolving each feature vector of the plurality of feature vectors to a corresponding standardized value of a database query language includes processing each feature vector of the plurality of feature vectors with a probabilistic model.

In some aspects, the techniques described herein relate to a non-transitory computer readable storage medium, including: scoring each feature vector of the plurality of feature vectors with respect to candidates from reference data table.

In some aspects, the techniques described herein relate to a non-transitory computer readable storage medium, including: mapping each feature vector of the plurality of feature vectors to a key value, wherein the key value corresponds to a candidate with a highest score.

DETAILED DESCRIPTION

Aspects generally relate to systems and methods for generating query parameters from natural language utterances.

Aspects may receive natural-language input in the form of a natural language utterance and may generate parameters that may be used to query a database based on the utterance. In accordance with aspects, a user may say or type a natural language phrase or sentence (an "utterance") into an interface, and a parameter generation platform may transform the utterance into a set of features that may, in turn, be resolved into a set of parameters that are compatible with a particular database query language or system. Aspects may utilize trained machine learning (ML) models and string-based algorithms to determine an intent of the utterance, map words, phrases, and symbols to entities, disambiguate the entities and map the entities to final values that represent parameter queries.

In accordance with aspects, an electronic device may be in operative communication with a parameter generation platform. The electronic device may be configured with a computer application (an "application") including an interface (e.g., a graphical user interface). The application may further be configured to be in operative communication with a parameter generation platform via a communication network and one or more communication protocols. For instance, the application may be configured to communicate with a parameter generation platform via a private network or via a public network (e.g., the internet). The application may be configured to receive an utterance from a user of the device/application through a device interface. For instance, the user may type the utterance from a keyboard, or speak the utterance into a microphone of the device. The application may be configured to capture the utterance and pass the utterance to the parameter generation platform.

If the utterance is spoken by a user and captured, e.g., by a microphone of the electronic device, the utterance may be captured as a digital recording and sent to the parameter generation platform, where a speech-to-text engine generates the spoken utterance as a text string. Alternatively, a spoken utterance may be converted to text by the application executing on the electronic device and sent to the parameter generation platform as a text string. If the utterance is typed by the user, then the string of text may be sent to the parameter generation platform. The utterance (whether text or digital audio) may be sent to the parameter generation platform in any acceptable manner, such as a parameter of an API call to an API method published by the parameter generation platform.

In accordance with aspects, parameter generation may be executed in a pipeline format that includes intent classification, entity extraction, and entity disambiguation.

Figure 1:
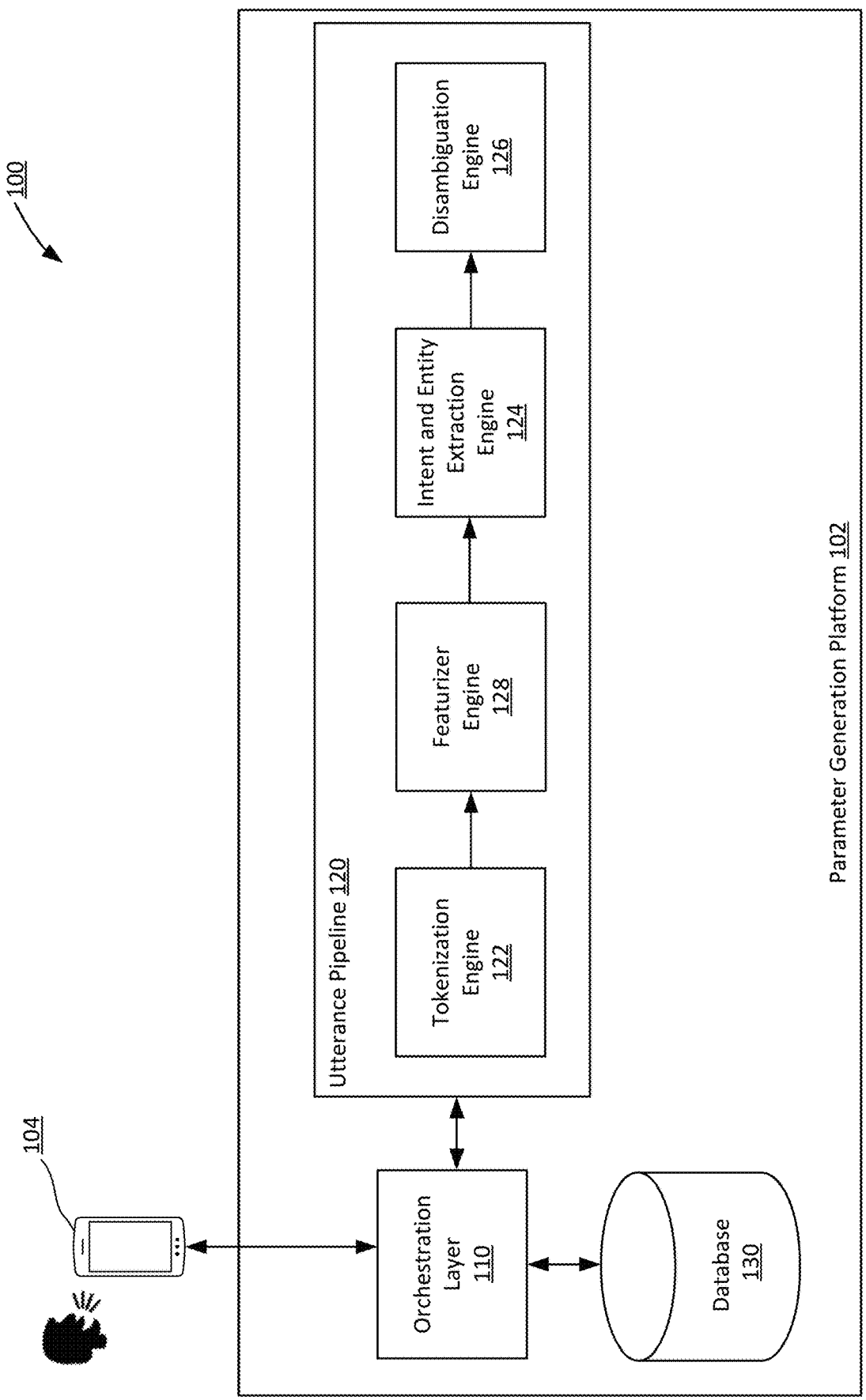
FIG. 1 is a block diagram of a system for generating query parameters from natural language utterances, in accordance with aspects.

FIG. 1 is a block diagram of a system for generating query parameters from natural language utterances, in accordance with aspects. System 100 includes electronic device 104 and parameter generation platform 102. Parameter generation platform 102 includes orchestration layer 110, database 130 and utterance pipeline 120. Utterance pipeline 120 includes tokenization engine 122, featurizer engine 128, intent and entity extraction engine 124, and disambiguation engine 126.

Orchestration layer 110 may receive a natural language utterance from electronic device 104 and may be configured to manage data transmissions to various components of parameter generation platform 102. Orchestration layer 110 may receive an utterance from electronic device 104 and convert the utterance to a string of text if received as digital audio. Alternatively, orchestration layer 110 may receive an utterance as a string of text. Orchestration layer 110 may pass the text string to utterance pipeline 120 for processing. After processing, orchestration layer 110 may receive generated parameters from utterance pipeline 120 and may configure the received parameters in a query of database 130. Database 130 may be any suitable database. For instance, database 130 may be a SQL-based relational database, a NoSQL datastore, such as an Apache® Cassandra® database, etc. Orchestration layer 110 may be configured to arrange the received parameters in an appropriate format for querying of database 130.

A natural language utterance received at utterance pipeline 120 may be passed to tokenization engine 122. Tokenization engine 122 may split the full utterance into constituent tokens. Tokenization engine 122 may perform sub-word tokenization for better generalization. Featurizer engine 128 may include one or more featurizer processes that convert tokens into numerical feature vectors for model input. After an utterance has been tokenized and converted into feature vectors, the features vectors may be sent to intent and entity extraction engine 124 for processing.

Intent and entity extraction engine 124 may include one or more machine learning models configured to perform intent classification and entity extraction and labeling. Entity intent classification may classify an utterance according to its relevancy based on the utterances. For instance, an intent classification for an utterance meant to query a purchase transaction database may be classified as a purchase transaction intent; an intent classification for an utterance meant to query an investment transaction database may be classified as an investment transaction intent, etc. Where more than one database is available for query in a parameter generation platform, intent classification may determine which database the utterance is meant to query, which entity types feature vectors should be assigned, and which query language the generated parameters will be formatted for.

In accordance with aspects, entity extraction is the process of mapping a feature vector (which may be aligned to a specific span of tokens in the utterance) to a labeling schema entity/type. For instance, a feature vector for the "charge" may be mapped to a trans_type entity that represents a transaction type field in an associated database. Similarly, a feature vector for the date term "Dec. 19, 2022" may be mapped to a date_eq entity that represents a "date is equal to" operation performed on a date field of a database, and a feature vector for the term "Appliance World" may be mapped to a merchant entity that represents a merchant field in a database.

With continued reference to FIG. 1, disambiguation engine 126 may perform disambiguation services that allow a feature vector to be resolved to a final valid entry in a relevant database. While a ML model may accurately map many different feature vectors each to their respective appropriate entity labels, the mapped feature itself may not be found as a field in the data base. For instance, Appliance World may be appropriately assigned the entity label "merchant," but the actual queryable value in the relevant database may be "Appliance World Conglomerate Ltd." Disambiguation services provided by disambiguation engine 126 may map extracted entities standardized and/or normalized values for database querying. Disambiguation engine 126 may include subcomponents and subprocesses for disambiguation.

In accordance with aspects, an utterance pipeline may include a tokenization engine. A tokenization engine may tokenize a received utterance. A tokenization process may include splitting a text string that comprises the full utterance into constituent tokens that are consumable by a machine learning (ML) model. A tokenization engine may include sub-word tokenization that allows operators and symbols (such as "$", "=", "<", ">", "+," dashes, hyphens, etc.) to be identified. Identification of non-word operators and symbols allows for better generalization of the utterance and significantly reduces the chance of a token being out of vocabulary.

Operator and symbol recognition by a tokenization engine may produce more usable results for parameter generation. For instance, the string "<$40", may be tokenized simply as "<$40" if a tokenizer is configured to split only on white space. However, if configured to account for various operators and symbols, the tokenizer may produce "<", "$", and "40" as tokens. Similarly, a tokenizer configured to identify operators and symbols as separate tokens may tokenize a date range provided as "06/01-07/01" as "06", "/", "01", "-", "07", and "01". A tokenizing engine may further be configured to address sub-word tokenization conflicts, such as under detection and over detection. For instance, an example of under detection may be that the term "bigmart" is split into two separate tokens (e.g., "big" and "##mart"), and that only "big" is assigned an entity type (e.g., assigned a merchant entity type). Accordingly, models/algorithms may be trained/configured to re-aggregate words of this nature.

In accordance with aspects, a featurizer (e.g., a featurizer engine) may provide one or more featurizer processes. A featurizer may convert tokens into numerical features for model input. A featurizer process may include a sparse featurizer and a dense featurizer. A sparse featurizer may produce a count of individual words, filtered by those most frequently occurring in the data, a count of sub-word character n-grams of, e.g., between 3 to 6 characters, and (in some aspects) regular expression (regex) patterns that may be supplied by data scientists for certain keywords. A dense featurizer may attempt to determine the semantic meaning of a word or an entire utterance in context. A dense featurizer may include model pre-trained weights that may consider word casing. A dense featurizer may convert word strings into a real valued feature vector for each word or sub-word of an utterance and a real valued feature vector for the entire utterance. Such feature vectors generated by a tokenization engine may be ingested by a ML model for processing/predictions. Counts and vectors generated by a featurizer may be passed to a model as input.

After a tokenization engine tokenizes and vectorizes an utterance string, the vectors may be passed to an intent and entity extraction engine. An intent and entity extraction engine may include a trained machine learning model that predicts an intent of the utterance based on the feature vectors received from the tokenization engine and assigns entity labels to the feature vectors received from the tokenization engine. The terms "entity extraction engine," "intent engine," and "intent and entity extraction engine" are used interchangeably herein. An intent and entity extraction engine may use a same or similar ML model for both intent prediction and entity extraction/labeling.

Intent classification may first determine that the utterance includes information that can be transformed into a query. For instance, intent classification may differentiate between a user's utterance that includes words that can be transformed into query parameters and an utterance that is statement or some other utterance that is unintelligible to the model. If it is determined that the utterance is transformable into a query, intent classification may determine what database or databases will be queried based on the received feature vectors.

For example, a ML learning model may be trained to recognize that an utterance is a query for a consumer purchase transaction database, an investment purchase database, or any other type of database that users may wish to search. Intent determinization may be based on the received feature vectors. In some aspects, intent classification may be a binary determination (e.g., the utterance may be transformed into a query, or it may not). In some aspects, an instance of a parameter generation platform may only service a single database, and only binary intent classification is needed.

In accordance with aspects, an entity extraction engine may map feature vectors to normalized entity labels used by a database or a database's query language. This may be done via a ML model that has been trained to recognize when a feature vector is associated with an entity-type. An entity extraction engine may assign entity labels to received feature vectors. That is, input to an entity extraction ML model may be a feature vector, and output may be a predicted entity label that the feature vector is associated with. An entity may be a parameter type or database field/column that may be used to query a relevant database. For instance, in an exemplary purchase transaction database, entities may correspond with database fields or query language operators.

Exemplary entities of a purchase transaction database may include a transaction type, a merchant, a spending category, a product type, a product name, an account number, various amount and/or amount range entities, and various date and/or date range entities, etc. Given the utterance "show me all purchases made at appliance world this month," "purchases" may be assigned the transaction type entity label, "appliance world" may be assigned the spending category type entity label, and "this month" (which may be identified and processed as a date range) may be assigned both a date_from and a date_to type entity label for an identified start and end date, respectively.

In accordance with aspects, some entities may require disambiguation. Disambiguation is the process of formatting extracted entities as a standardized and/or normalized parameter value for querying a database. A standardized value for an entity type may be a value that can actually be found in a relevant database. That is, even though a feature vector has been properly labeled with an entity type, the value of the feature vector may not be queryable (or queryable in a simple manner) from a data store because the value is not present in the data store. This may be due to colloquial utterances, spelling mistakes, use of synonyms, use of non-structured terms where structured data is needed (e.g., "last week," "the second of May," etc.), etc.

Disambiguation may be performed by a disambiguation engine, which may include several processing methodologies for arriving at a standardized value of an entity label. A disambiguation engine may map a labeled feature vector to a final parameter resolution. In the case of structured data fields, a disambiguation engine may assist, or override, an entity extraction engine in selecting a final entity type that is assigned.

In accordance with aspects, a probabilistic model which parses text to extract structured data fields such as dates, amounts, emails, distances, etc., may be used in disambiguation, particularly for complex strings of operators and symbols. For instance, a probabilistic rule-based library may be used for entity resolution of raw entity spans such as "last week" to a numerical date, or "Apr. 1, 2022" to a standardized numerical date format (e.g., a yyyy/mm/dd format). A probabilistic model, however, may be inadequate for the complexity observed in patterns from a user utterance. Accordingly, aspects may further incorporate curated rules to manage conflicts between entity disambiguation processes and entity extraction/labeling processes for structured data fields. For instance, if there is a conflict, a rule may specify that an entity type selected by a disambiguation model may be prioritized/used over one selected by an entity extraction model/engine.

Aspects may also include other pre and post processing rule operations to aid in disambiguation of structured data. For instance, before a probabilistic model is used for disambiguation, certain entities that may have been split by an entity extraction engine may be merged. An exemplary merging operation may be a provided date range of "August 2nd to 10th" that was split by an entity extraction engine to "August 2nd" and "10th". The probabilistic model, however, may fail to resolve "10th" as "August 10th" and a merger may be required. Moreover, a probabilistic model may be configured to recognize ordinals such as "1st", "2nd", "3rd", etc. So ordinal suffixes such as "st", "nd", "rd", and "th" may be appended to numerals that are identified as ordinals. Moreover, regex patterns may be employed to map diverse date formats such as "mm/ddyy", "mmdd/yy", "mmddyy", "mm/ddyyyy", "mmdd/yyyy", and "mmddyyyy" each to a standard format such as "yyyy/mm/dd" to make model output more consistent and reliable. Regex patterns may also be used to account for months such as "May" which are often not interpreted as part of a date. Additionally, amount entities may be prepended with an appropriate symbol, such as "$", etc., where monetary amounts may only be interpreted correctly when the appropriate symbol is present.

In accordance with aspects, for disambiguation of words (including sub-words, misspelled words, etc.) in an utterance, a reference data table may be used to map candidate output from a disambiguation engine to a final-resolution label. A reference data table may include keys that are final labels and candidates that are determined to be lexically similar to feature vectors from an utterance. A disambiguation engine may match/select candidates from a reference table that are determined by the engine to be either lexically or semantically similar to a word or phrase from an utterance. The selected candidate's corresponding key value may be used as a final resolution parameter that may be used on a database query.

Figures 2, 3:
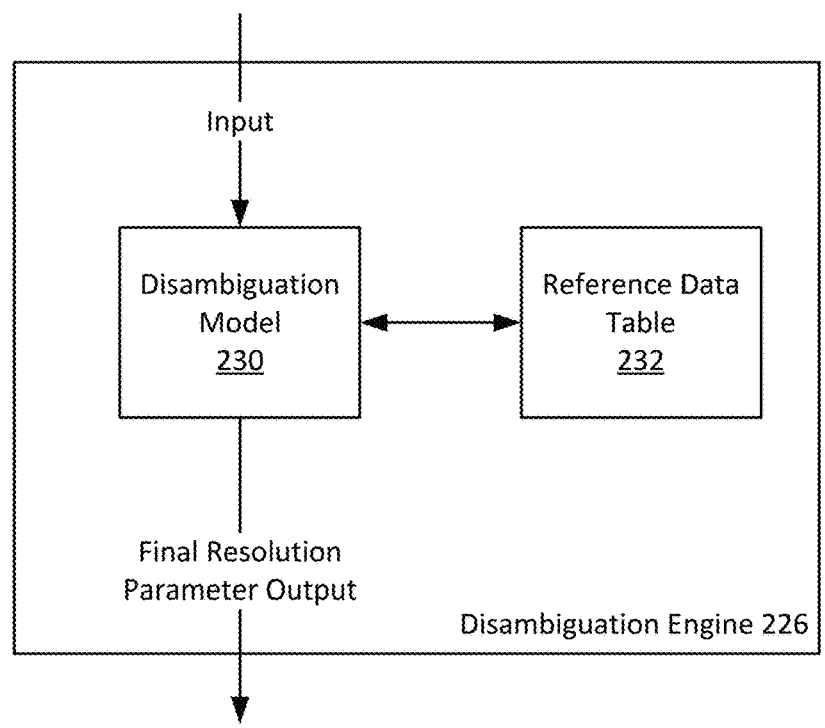
FIG. 2 is a block diagram of a disambiguation engine, in accordance with aspects.
FIG. 3 shows an exemplary Levenshtein distance computation, in accordance with aspects.

FIG. 2 is a block diagram of a disambiguation engine, in accordance with aspects. Disambiguation engine 226 includes disambiguation model 230 and reference data table 232. As shown in FIG. 2, disambiguation model 230 may receive input. The input may be in the form of a feature vector, e.g., from an entity extraction engine. Disambiguation model 230 may perform one or more disambiguation processes on the input. Disambiguation processes may include processing input with various components such as ML models, probabilistic models and, string-based algorithms. Processed input may be scored with respect to various candidates from reference data table 232. A key value from reference data table 232 that is associated with the highest scoring candidate may be selected as a final resolution parameter, and the final resolution parameter may be output from disambiguation model 230. In accordance with aspects, if more than one candidate field includes the highest scoring candidate value, then the key values for both candidate fields may be output by reference data table 232.

Aspects may use string-based algorithms, such as Levenshtein distance, to compute a similarity between strings and select candidates for a key. Levenshtein distance computes the minimum number of edits (insertions, deletions, or substitutions) required to change one word into another word. Given a list of possible candidate words, a disambiguation engine may select candidates that have less than a threshold Levenshtein distance.

FIG. 3 shows an exemplary Levenshtein distance computation, in accordance with aspects. In FIG. 3, the word "digital" may be a candidate term, and the misspelled word "digtial" may require disambiguation. FIG. 3 shows a Levenshtein distance of 2, since "digital" is only 2 substitutions away from "digtial". Levenshtein distance is relatively quick to execute when the candidate/synonym list is small and works well when words are lexically similar.

In another example of using Levenshtein distance, a given utterance may be, "Can I see all transactions from my FirstCredit card." The term "FirstCredit card" may require disambiguation. Relevant candidates may include, e.g., "Bank FirstCredit," "Bank SubCredit," "Bank Equity Credit," etc. When a Levenshtein distance is computed using the utterance term "FirstCredit card" and each of the relevant candidates, "Bank FirstCredit" will produce the highest score (i.e., the lowest Levenshtein distance), and may be mapped to the final label resolution (or other disambiguation may additionally be performed).

Aspects may also use a pretrained transformer ML model trained for performing multi natural language inference (MNLI) in disambiguation. A transformer model converts the problem of entity linking into a N-way entailment problem, where N refers to a number of possible resolutions. An MNLI model leverages semantic similarity learned during the training process and works even when the candidate is not lexically similar to the entity mentioned in the received utterance. An MNLI model may output a score for various candidates with respect to a given feature vector. The score may be from 0 (being the lowest) to 1 (being the highest). The feature may be mapped to the corresponding key value of the candidate receiving the highest score from the model.

In accordance with aspects, a disambiguation engine may combine multiple process modules for feature disambiguation in a sequential pipeline. For instance, a first module (e.g., a string-based algorithmic module) may receive input and return one or more top candidates. The top candidates may include a confidence score. Using a threshold value, a determination may be made whether the confidence score exceeds the threshold value and/or the first N values are within a given ambiguity threshold. If so, these candidates may be used to map input features to the candidates corresponding key values from a reference data table. If, however, the confidence score(s) do not exceed the threshold value, then the input feature may proceed to the next module for processing. This may continue until the last processing module in the disambiguation engine processes the input feature. It is contemplated that a disambiguation engine may have as many processing modules as is necessary or desired.

Figure 4:
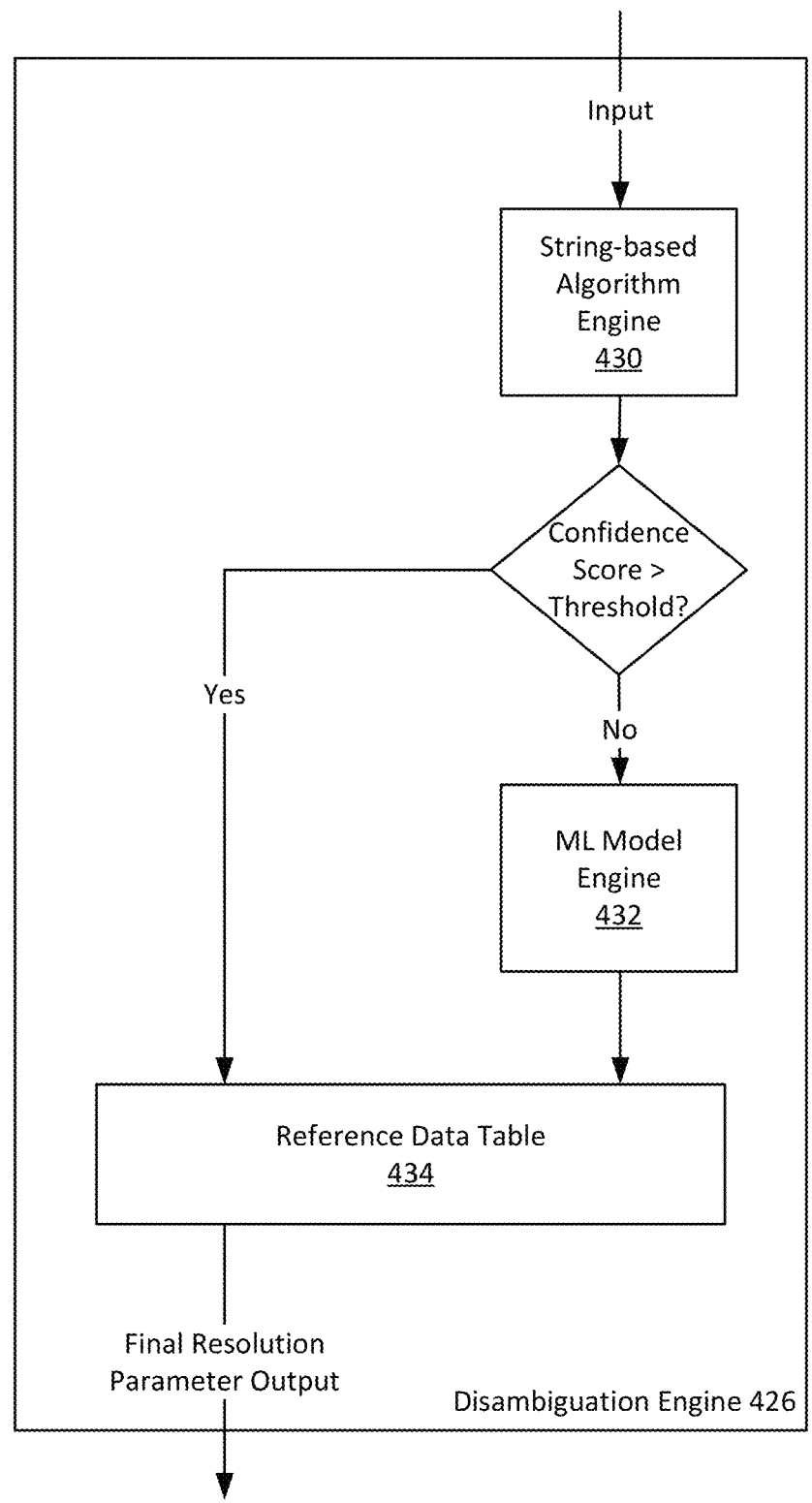
FIG. 4 is a block diagram of a disambiguation engine pipeline, in accordance with aspects.

FIG. 4 is a block diagram of a disambiguation engine pipeline, in accordance with aspects. Disambiguation engine 426 includes string-based algorithm engine 430, ML model engine 432, and reference data table 434. Disambiguation engine 426 may receive input such as an input feature from, e.g., an entity extraction engine. The input feature may be sent to string-based algorithm engine 430 (a first processing module) for initial processing. String-based algorithm engine 430 may process the input feature and output a score with respect to one or more candidate values (e.g., from reference data table 434). If the score of one or more of the candidate values are above a predefined threshold, then the input feature may be mapped to that candidate's corresponding key value in reference data table 434, and the key value may be output as a final resolution parameter. If, however, none of the one or more candidates score over the threshold number, then the input feature may be sent to ML model engine 432 (a second processing module) for processing. The input feature may be mapped to the top scoring candidate's key value resulting from ML model engine 432's processing of the input feature, and that key value may be output as a final resolution parameter.

In accordance with aspects, reference data augmentation may be used to improve disambiguation. While resolutions of reference data to keys are predefined, it is important to populate candidates carefully. Quality candidates should align closely with common user utterances. Entity spans from annotated data may be a good source for synonym candidates. An entity span is a text span contained in a full utterance that corresponds to a single entity unit. For instance, given the utterance "transactions from last week," an included entity span may be "last week." Synonyms of labelled data which are most frequently associated with a given entity label may be added as candidates in initial seeding of reference data mapping to improve recall of entity disambiguation. Additional synonyms for selected candidates may be generated by augmenting synonyms with character perturbations and selecting top matches from their most similar synonyms with similarity calculated using word vector representations.

In accordance with aspects, the following describes exemplary data augmentation strategies and some of their benefits in model training: Short text augmentations create short utterances with and without entity spans and help in identifying short user utterances (e.g., "food," "last week," etc.). Generation of zero, one, or multiple entities are supported for short utterances. Amount range augmentations help to identify operator-based amount range specifications (e.g. "<$50", ">=$50", "$600+"). Case agnostic augmentations for dates, merchants, product names, etc., help make models robust in dealing with changing cases in various spellings of input. Account number and dollar amount augmentations help prevent models from relying on occurrence and/or length of numbers. Data balancing for conflicting spans between entity types help models achieve a more balanced approach to classification.

Other exemplary augmentation methodologies include backtranslation and paraphrasing machine learning augmentations. Paraphrasing techniques generate semantically similar utterances by paraphrasing them using language models. The generated paraphrases may be passed to a model for training. Backtranslation perturbs input by taking input (e.g., an English sentence) and translates it to one or more other languages. Then the sentence in the one or more other languages is translated back to English. This methodology will create a different version of the sentences due to acceptable variations on how a concept of a sentence may be formed when translated into a language. That is, the essence of the sentence is maintained, but the actual string value of the translation will very often be different, particularly for more complex sentences.

Still other exemplary augmentation strategies for model training include keyboard perturbations (generating utterances with character errors in the words, based on proximity of the word on a keyboard), swap perturbations (generating utterances with words swapped in them, and with characters inside or words swapped, but with similar semantic meaning to the source utterance/word), singular-plural perturbations (generating utterance augmentations by changing them from singular to plural and vice-versa), and deletion perturbations (generating utterance augmentations by deleting randomly chosen letters from word(s) in an utterance).

Figure 5:
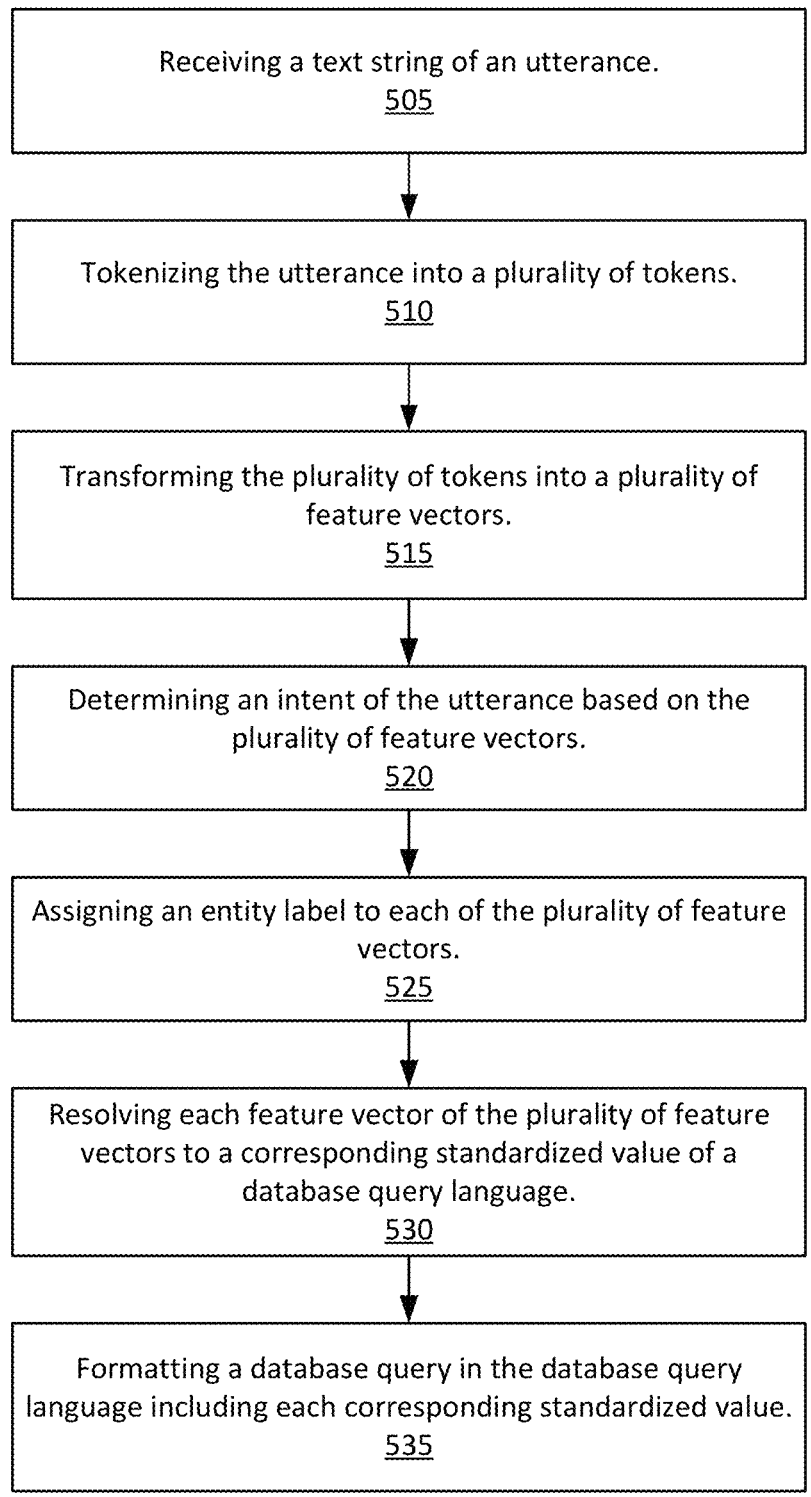
FIG. 5 is a logical flow for generating query parameters from natural language utterances, in accordance with aspects.

FIG. 5 is a logical flow for generating query parameters from natural language utterances, in accordance with aspects.

Step 505 includes receiving a text string of an utterance.

Step 510 includes tokenizing the utterance into a plurality of tokens.

Step 515 includes transforming the plurality of tokens into a plurality of feature vectors.

Step 520 includes determining an intent of the utterance based on the plurality of feature vectors.

Step 525 includes assigning an entity label to each of the plurality of feature vectors.

Step 530 includes resolving each feature vector of the plurality of feature vectors to a corresponding standardized value of a database query language.

Step 535 includes formatting a database query in the database query language including each corresponding standardized value.

Figure 6:
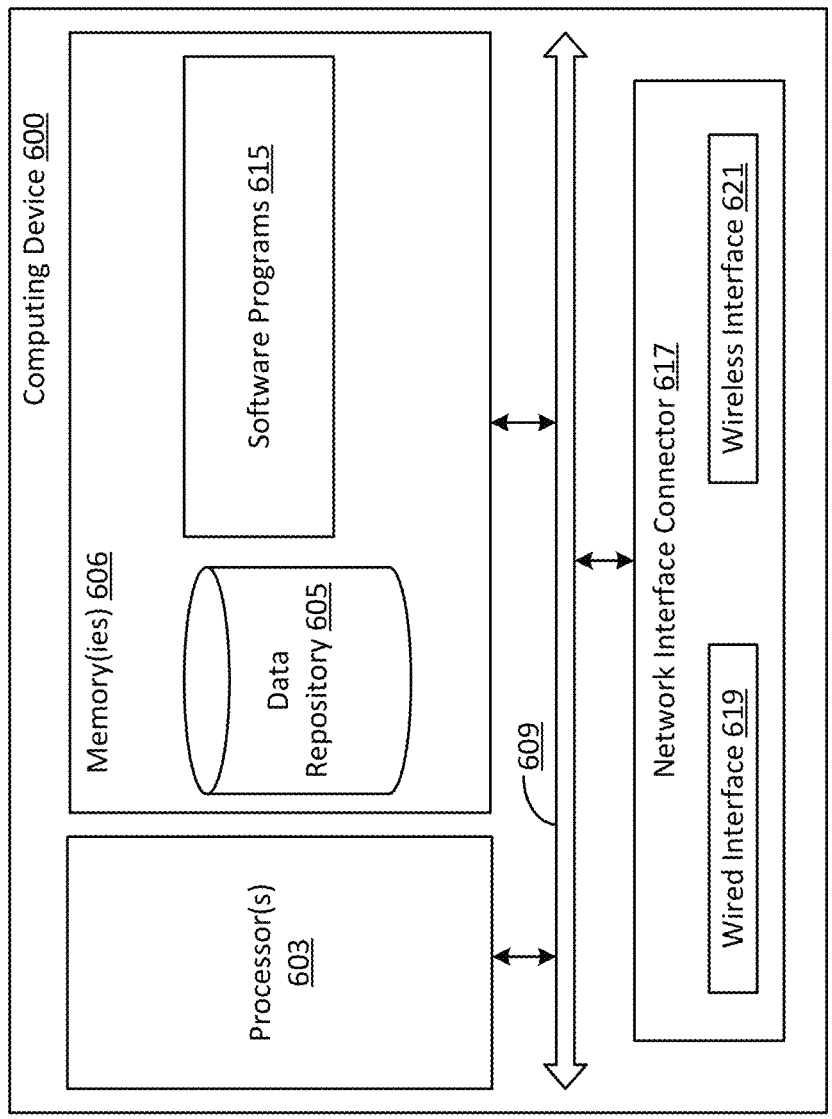
FIG. 6 is a block diagram of a computing device for implementing certain aspects of the present disclosure.

FIG. 6 is a block diagram of a computing device for implementing certain aspects of the present disclosure. FIG. 6 depicts exemplary computing device 600. Computing device 600 may represent hardware that executes the logic that drives the various system components described herein. For example, system components such as an electronic device, an orchestration layer, an utterance pipeline and its various subcomponents, various database engines and database servers, and other computer applications and logic may include, and/or execute on, components and configurations like, or similar to, computing device 600.

Computing device 600 includes a processor 603 coupled to a memory 606. Memory 606 may include volatile memory and/or persistent memory. The processor 603 executes computer-executable program code stored in memory 606, such as software programs 615. Software programs 615 may include one or more of the logical steps disclosed herein as a programmatic instruction, which can be executed by processor 603. Memory 606 may also include data repository 605. Data repository 605 may be nonvolatile memory for data persistence. The processor 603 and the memory 606 may be coupled by a bus 609. In some examples, the bus 609 may also be coupled to one or more network interface connectors 617, such as wired network interface 619, and/or wireless network interface 621. Computing device 600 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," etc. These may be a general-purpose computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement an invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
    receiving, by a user device, an utterance as an audio file;
    receiving, by an orchestration layer of a parameter generation platform, the utterance;
    converting, by the orchestration layer, audio file of the utterance into a text string;
    tokenizing, by a tokenization engine of the parameter generation platform, the utterance into a plurality of tokens, each token of the plurality of tokens comprising a portion of the utterance separated by a space, wherein tokenizing includes identifying one or more tokens of the plurality of tokens to be operators and symbols within the utterance;
    transforming, by a featurizer engine of the parameter generation platform, the plurality of tokens into a plurality of feature vectors, the featurizer engine comprising a sparse featurizer and a dense featurizer, the sparse featurizer providing a count of frequent individual words that are filtered based on individual words occurring in a plurality of received utterances, the dense featurizer providing a semantic meaning in context by converting one or more word strings of the utterance into a real valued feature vector, the plurality of feature vectors comprising the count of frequent individual words and the real valued feature vector;
    determining, by a machine learning model of the parameter generation platform, an intent classification of the utterance based on the plurality of feature vectors;
    classifying, by the machine learning model, the text string into query parameters;
    determining, by the machine learning model, a database of a plurality of databases to query based on the plurality of feature vectors;

assigning, by the machine learning model, an entity label to each of the plurality of feature vectors;
resolving, by a disambiguation engine of the parameter generation platform, each feature vector of the plurality of feature vectors to a corresponding standardized value of a database query language, wherein resolving the each feature vector of the plurality of feature vectors to a corresponding standardized value of a database query language includes processing the each feature vector of the plurality of feature vectors with a string-based algorithm computing a Levenshtein distance;
scoring, by the disambiguation engine, the each feature vector of the plurality of feature vectors with respect to a plurality of candidates from a reference data table;
mapping, by the disambiguation engine, the each feature vector of the plurality of feature vectors to a key value, wherein the key value corresponds to a candidate of the plurality of candidates with a highest score, the highest score calculated based on the Levenshtein distance;
determining, by the disambiguation engine, a conflict between the corresponding standardized value and the entity label; and
overriding, by the disambiguation engine, the entity label based on the determination.

2. The method of claim 1, comprising:
formatting a database query in the database query language including each corresponding standardized value.

3. The method of claim 1, wherein resolving the each feature vector of the plurality of feature vectors to a corresponding standardized value of a database query language includes processing the each feature vector of the plurality of feature vectors with a probabilistic model.

4. A system comprising:
a processor,
a memory connected to the processor, the memory including instructions that, when executed by the processor, cause the processor to:
receive, by a user device, an utterance as an audio file;
receive, by an orchestration layer of a parameter generation platform, the utterance;
converting, by the orchestration layer, audio file of the utterance into a text string;
tokenize, by a tokenization engine of the parameter generation platform, the utterance into a plurality of tokens, each token of the plurality of tokens comprising a portion of the utterance separated by a space, wherein tokenizing includes identifying one or more tokens of the plurality of tokens to be operators and symbols within the utterance;
transform, by a featurizer engine of the parameter generation platform, the plurality of tokens into a plurality of feature vectors, the featurizer engine comprising a sparse featurizer and a dense featurizer, the sparse featurizer providing a count of frequent individual words that are filtered based on individual words occurring in a plurality of received utterances, the dense featurizer providing a semantic meaning in context by converting one or more word strings of the utterance into a real valued feature vector, the plurality of feature vectors comprising the count of frequent individual words and the real valued feature vector;
determine, by a machine learning model of the parameter generation platform, an intent classification of the utterance based on the plurality of feature vectors;
classify, by the machine learning model, the text string into query parameters;
determine, by the machine learning model, a database of a plurality of databases to query based on the plurality of feature vectors;
assign, by the machine learning model, an entity label to each of the plurality of feature vectors;
resolve, by a disambiguation engine of the parameter generation platform, each feature vector of the plurality of feature vectors to a corresponding standardized value of a database query language, wherein resolving the each feature vector of the plurality of feature vectors to a corresponding standardized value of a database query language includes processing the each feature vector of the plurality of feature vectors with a string-based algorithm computing a Levenshtein distance;
scoring, by the disambiguation engine, the each feature vector of the plurality of feature vectors with respect to a plurality of candidates from a reference data table;
mapping, by the disambiguation engine, the each feature vector of the plurality of feature vectors to a key value, wherein the key value corresponds to a candidate of the plurality of candidates with a highest score, the highest score calculated based on the Levenshtein distance;
determining, by the disambiguation engine, a conflict between the corresponding standardized value and the entity label; and
overriding, by the disambiguation engine, the entity label based on the determination.

5. The system of claim 4, wherein the instructions further cause the processor to:
format a database query in the database query language including each corresponding standardized value.

6. A non-transitory computer readable storage medium, including instructions stored thereon, which instructions, when read and executed by one or more computer processors, cause the one or more computer processors to perform steps comprising:
receive, by a user device, an utterance as an audio file;
receiving, by an orchestration layer of a parameter generation platform, the utterance;
converting, by the orchestration layer, audio file of the utterance into a text string;
tokenizing, by a tokenization engine of the parameter generation platform, the utterance into a plurality of tokens;
transforming, by a featurizer engine of the parameter generation platform, the plurality of tokens into a plurality of feature vectors, the featurizer engine comprising a sparse featurizer and a dense featurizer, the sparse featurizer providing a count of frequent individual words that are filtered based on individual words occurring in a plurality of received utterances, the dense featurizer providing a semantic meaning in context by converting one or more word strings of the utterance into a real valued feature vector, the plurality of feature vectors comprising the count of frequent individual words and the real valued feature vector;

determining, by a machine learning model of the parameter generation platform, an intent classification of the utterance based on the plurality of feature vectors;
classifying, by the machine learning model, the text string into query parameters;
determining, by the machine learning model, a database of a plurality of databases to query based on the plurality of feature vectors;
assigning, by the machine learning model, an entity label to each of the plurality of feature vectors;
resolving, by a disambiguation engine of the parameter generation platform, each feature vector of the plurality of feature vectors to a corresponding standardized value of a database query language, wherein resolving the each feature vector of the plurality of feature vectors to a corresponding standardized value of a database query language includes processing the each feature vector of the plurality of feature vectors with a string-based algorithm computing a Levenshtein distance;
scoring, by the disambiguation engine, the each feature vector of the plurality of feature vectors with respect to a plurality of candidates from a reference data table;
mapping, by the disambiguation engine, the each feature vector of the plurality of feature vectors to a key value, wherein the key value corresponds to a candidate of the plurality of candidates with a highest score, the highest score calculated based on the Levenshtein distance;
determining, by the disambiguation engine, a conflict between the corresponding standardized value and the entity label; and
overriding, by the disambiguation engine, the entity label based on the determination.

7. The non-transitory computer readable storage medium of claim 6, comprising:
formatting a database query in the database query language including each corresponding standardized value.

8. The non-transitory computer readable storage medium of claim 6, wherein resolving the each feature vector of the plurality of feature vectors to a corresponding standardized value of a database query language includes processing the each feature vector of the plurality of feature vectors with a probabilistic model.

\* \* \* \* \*